July 24, 1951  P. V. McCASH  2,561,935
REVOLVABLE SPOOL SPINNING REEL
Filed May 12, 1948  2 Sheets-Sheet 2
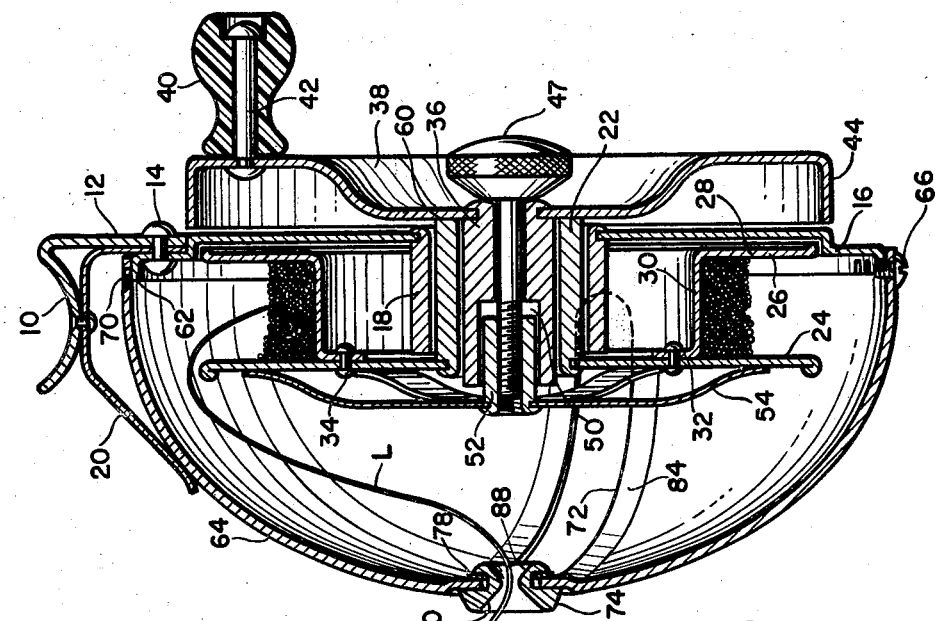
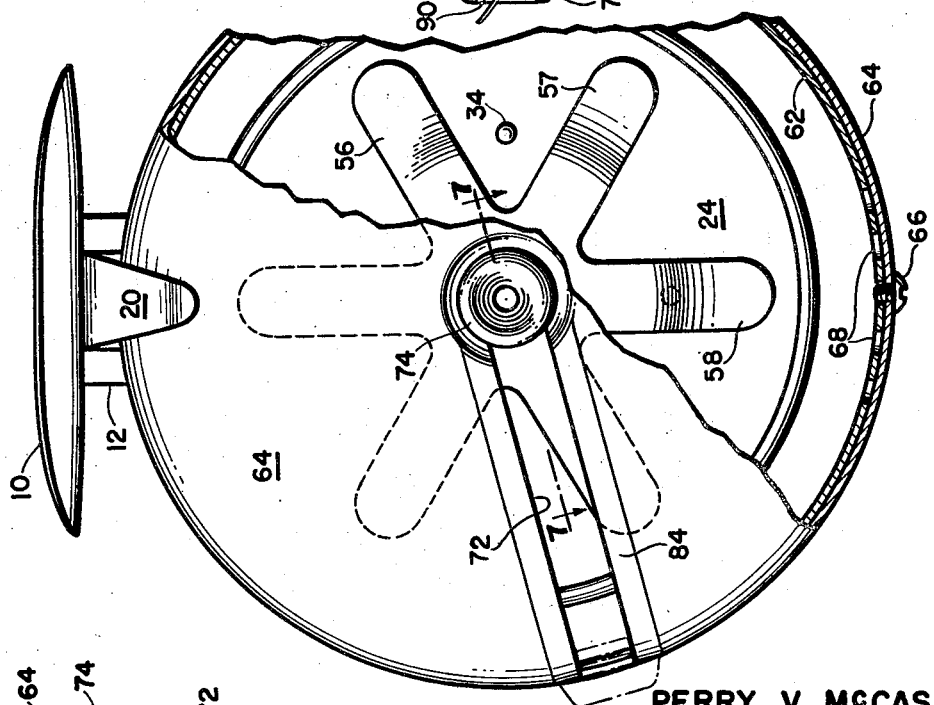
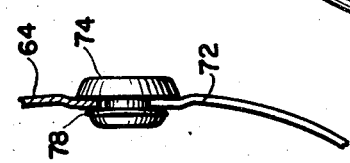
PERRY V. McCASH
Inventor
By Smith & Tuck
Attorneys Patented July 24, 1951

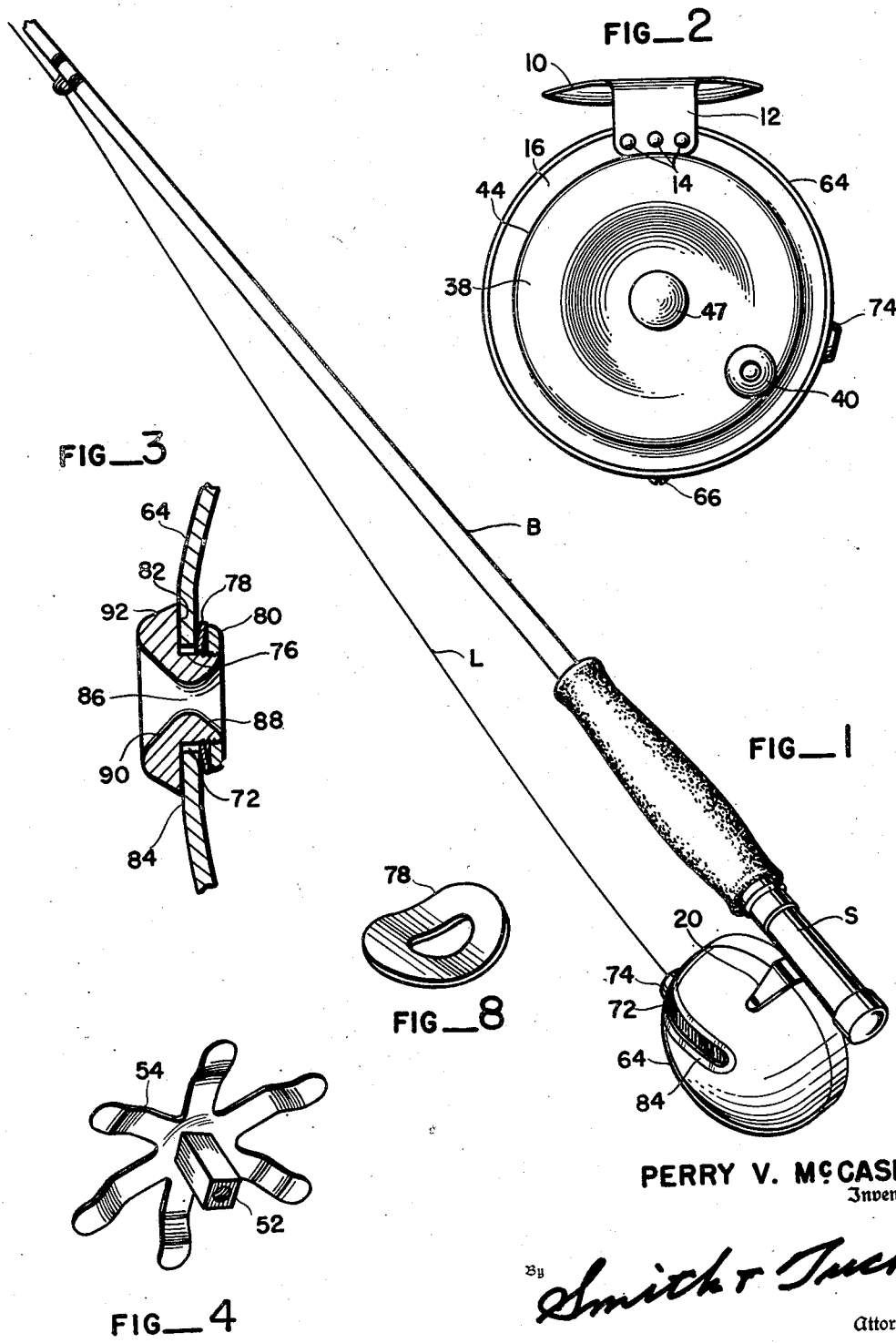

2,561,935

UNITED STATES PATENT OFFICE 2,561,935

REVOLVABLE SPOOL SPINNING REEL

Perry V. McCash, Seattle, Wash.

Application May 12, 1948, Serial No. 26,547

4 Claims. (Cl. 242—84.5)

My present invention relates to the general art of fishing reels, and more particularly to a revolvable spool spinning reel.

The general principles of the so called spinning reel and by that is meant, the type of reel where the line, in casting, is taken off the end of a stationary spool, have been generally understood for a long time, it has however, taken the final development of the raw silk and nylon lines to permit the fullest advantage to be taken of this unique principle.

Fishing reels of the spinning type have been known for some twenty years, in this country, yet the various reels that have been presented to the market have normally been characterized by revolutionary and unhandy design. The usual construction is that wherein the spool of the reel is disposed at right angles to the rod. Other forms of construction, provide for pivoting of the spool so that it could be placed with the axis of the spool parallel to the axis of the rod, for casting and then changed so that the axis of the spool is at right angles to the rod for the reeling operations. Any such structure however, must of necessity place the reel on the rod so that it extends out and makes a clumsy arrangement which is very unhandy under many fishing conditions, and which tends to unbalance the casting rod so the maximum casting distance and accuracy of cast are interfered with.

There have been some developments along the general line of my present reel, wherein the spool itself is fixed in the general plane of the rod, in other words, the axis of the spool is at right angle to the rod. Those constructions observed to date, however, have been characterized by having a fixed spool and some form of finger arrangement that is driven by the hand crank so as to wind the line on the fixed spool. This form of reel has many advantages, in that it makes a unit which compares favorably in appearance and balance with the highest development of fly fishing reels. There has been considerable difficulty however, in getting a free cast, due to the fact that the line in casting must pass over, normally, two right angle bends.

I believe that I have overcome many of the outstanding disadvantages of existing reels of a spinning type by providing in my reel, arrangement whereby the reel's line holding spool is stationary when the cast is made and the line pulled off the end of the spool. I then provide means whereby, when it is desired to reel in the line, that the line instead of passing through a tortuous path, involving a couple of right angle turns, is arranged so that it spools straight from the last guide on the pole to the line holding spool in a manner that is strictly conventional, without any sharp bends and wherein the spool itself is manually turned, directly. This is a great advantage when playing large fish for instance, and at all times tends to prevent the excessive wear occasioned by the observed types which use the double bend arrangement for these lines, whether it is being spooled or cast.

The principal object of my present invention, therefore, is to provide a spinning reel in which the line is taken off the end of the spool, which is stationary during the casting period, and having the spool turn by the hand crank, so that in reeling-in, or playing a fish the line is spooled in a normal manner, where even though considerable strain is placed upon it, long life is thereby to be expected of the line.

A further object of my invention is to provide a reel which is mounted with its axis at right angles to the pole, and which is appearance and balance is comparable to the standard type of fly reel.

A further object of my present invention is to inclose the spool of my reel with a dome shaped housing, which has substantially radially disposed at one point a closed end slot in which is disposed a line guiding bushing which is capable of favorable placement for both the casting operation and the reeling-in operation.

A further object of my invention is to provide a spinning reel in which the line holding spool is frictionally driven and wherein means is provided that is convenient in operation for the application of various degrees of frictional engagements.

A further object of my invention is to provide means whereby my reel can be quickly adapted for use either by a right or by a left handed fisherman.

A further object of my invention is to provide means whereby my reel can be quickly disassembled and re-assembled so as to permit easy cleaning or lubricating thereof.

Further objects, advantages and capabilities will be apparent from the description and disclosure in the drawings, or may be comprehended or are inherent in the device.

In the drawings:

Fig. 1 is a perspective view of a portion of a fishing pole showing my reel, attached thereto, in its normal position of use.

Fig. 2 is a side elevation of my reel.

Fig. 3 is a fragmentary cross-sectional view showing the line guiding bushing of my device together with frictional positioning means for the same.

Fig. 4 is a perspective view showing the general form of my friction drive transfer means.

Fig. 5 is a cross sectional view, on an enlarged scale, showing the various elements of my reel.

Fig. 6 is a side view of my reel with certain parts shown in section, to better illustrate the construction thereof.

Fig. 7 is a sectional view taken along the line 7—7 of Fig. 6.

Fig. 8 is a perspective view showing the friction washer used on my line guiding bushing.

Referring more particularly to the disclosure in the drawings, the numeral 10 designates the reel seat clip. This member conforms to standard practice in that it has two ends somewhat pointed, which are adapted to be engaged by the retaining bands of the reel seat S of a standard fishing pole, as shown. Formed normally as part of clip 10, and extending away from the pole is the reel supporting plate 12. This plate is fixedly secured as by rivets 14 to the reel bearing plate 16. Bearing plate 16 has fixedly secured to it the bearing 18 within which the revolving portions of my reel are journaled. Secured normally to pole clip 10 and to the bearing plate 16, is a spring clip member 20, the exact purpose of which will be explained later.

Adapated to revolve freely within bearing 18 is the reel spool journal 22. Journal 22 has fixed secured to it the spool side plate 24. Fixedly secured to side plate 24 is a spool plate 26. Plate 26, as will best be observed in Fig. 5, has one portion as 28 which is parallel to side plate 24, a portion which forms the hub as 30 of the line carrying spool and a second portion as 32 parallel to side plate 24, and through which the permanent attachment is provided as by means of a plurality of rivets 34. It is understood, it is believed, that welding or other securing means might be substituted for rivets 14 and 34, however, the rivets are convenient and do not cause any interference.

In Fig. 5 I have shown considerable clearance between bearings 18, 22 and 36. This has been so shown in the interest of clarity of illustration only. These bearings are normal running fits or may use rollers of the needle type if desired.

It will be noted that the line-carrying spool is supported essentially from one side only in a cantilevered manner whereby, the line may be cast off the spool over the flange or side-plates without interference, by supporting structure.

Disposed for rotation within reel journal 22, is the handle plate journal 36. To journal 36 is fixedly secured the handle drum or plate 38, and to which in turn is secured the operating handle 40, which is positioned as on rivet 42, so that it is free to revolve upon the rivet. Plate 38 is provided with an outer periphery 44, which presents a surface that is parallel to the axis of rotation when cut in sections after the showing in Fig. 5. This portion of the plate is provided as a braking surface, so that if a fish should take command of the reel, the fisherman can, by applying finger pressure to the relatively large diameter surface have at his disposal a convenient braking means. At its center, plate 38 is dished so as to accommodate the friction adjusting screw 47.

Screw 47 passes, axially through journal 36, and is free to revolve therein. At its inner end journal 36 is formed with a square recess 50. Into recess 50, with a clearance assuring free sliding movement is the square friction spider hub 52. Screw 47 is threaded into hub 52 so as to provide a positioning means for said hub. Fixedly secured to hub 52 is a friction spider 54, which preferably should have a plurality of arms as 56, 57, 58. In the drawings I have shown six such arms, the exact number is largely a matter of design, but arms are to be preferred over any form of a complete disc, as it is very desirable to have resilient arms, so that a wide range of frictional engagement can be provided between the driving handle 40, and the line holding reel, which is contacted through the spool side plate 24.

It is believed to be clear, from a study of Fig. 5, that as tension is placed upon screw 47, by screwing it into hub 52, increased pressure will be placed upon the spider arms as 56, 57 etc., this will tend to draw the line holding reel assembly towards the bearing plate 16, until the hollow spool journal 22 comes into frictional engagement with plate 38, as at 60.

By adjustment of screw 47, the amount of frictional engagement between plate 38 and indirectly handle 40, and the line carrying spool, will thereby be subject to a wide range of frictional engagement, a factor that is to be found very desirable, particularly where a fish of considerable weight may strike the lure. Under such conditions the fish should automatically be given a certain amount of line to run with, in order that he will not have a chance to exert his weight on the relatively light line, normally used, and break the same.

Extending outwardly from bearing plate 16, and centered by its annular rim as 62, is a dome-like reel cover 64. To secure the cover in place I prefer to use only one screw as 66, passing through cover 64 and engaging in one of a plurality of holes or notches 68 formed within rim 62. This permits changing the angular relationship of dome 64 to the reel backing plate 16. It is desirable to have this angular relationship subject to adjustment as will be shown shortly. If however, the change is to be made for a left handed fisherman, assuming that the reel is set up for a right handed fisherman, the drum 64 is revolved 180° so that screw 66 now passes through opening 70 and the suitable hole 68 may again be engaged to give the desired adjustment. Spring clip 20 co-acting with rim 62, secures dome 64 in its position of use.

Substantially radially disposed, with respect to dome 64, is a guide-way or slot 72, this slot forms a guideway for the line guiding bushing 74. Slot 72 is formed as a closed-end slot. One end, after showing in Fig. 6, being of sufficient extent that the guide bushing 74, can assume a position along the axis of the line carrying spool, this position is employed when a cast is being made. The opposite end of slot 72 should extend far enough around dome 64 so that line L can assume the general position shown in Fig. 1, or in other words, the guide button 74 should be able to assume a position that will place it within the plane of the coil of line upon the spool. This position will be attained manually when the line is being reeled in, or automatically if the fisherman is playing a hooked fish which places considerable strain on line L.

The detailed construction of slot 72 and of bushing 74 will probably best be understood by reference to Figs. 6, and 7 and particularly Fig. 3. Here it will be noted that the journal portion as 76 of bushing 74 has considerable clearance within slot 72. A fluted spring washer 78 rests upon the journal 76, and the bushing is held, generally in position, by the threaded nut 80 which is threadedly secured in adjusted position, substantially after the showing of Fig. 3. As an inexpensive construction bushing 74 may be riveted in place after Fig. 5. The out-board portion of bushing 74 is provided with a bearing face 82, which is formed as a plane normal to journal 76. Then in order to provide a full bearing upon dome 64 which is of curve or parabolic shape, I provide for a flattened margin as 84, which entirely surrounds slot 72. This is shown best in Fig. 3. As bushing 74 provides the exit of the line and must carry the line out with the minimum of friction, and at the same time, when the line is reeled in, the line will be under considerable strain and there again, the bushing should provide the minimum of friction for the line which normally will always be passing through bore 86 on an angularly disposed path. To achieve this condition of minimum friction, I have provided the double conical bore at 88, and at 90. I also provide a sloping outer surface, as 92 for bushing 74, so the line will tend to slip over the same, rather than become ensnarled on it, in case any slack is present in the line at any stage of the fishing operation.

Normally in fishing, the bushing 74 will be positioned in one of the two extreme positions it is capable of assuming, due to slot 72. It will be actually disposed after the showing of Fig. 5, during the casting operations and during the reeling-in operations it will be positioned as the other limit of slot 72.

It is believed that it will be clearly apparent from the above description and the disclosure in the drawings that the invention comprehends a novel construction of a revolvable spool spinning reel.

Having thus disclosed the invention, I claim:

1. A revolvable spool spinning reel, consisting of: a bearing plate, of circular form, having a concentric recess adapted to receive a side plate of a line holding spool and a peripheral rim; an axial bearing secured to said bearing plate; means for securing said bearing plate to a fishing pole; a fishing line spool, having a concentric sleeve bearing, revolvably journaled within said axial bearing and adapted to support said spool in a cantilevered manner; a handle plate having a bearing adapted to be journaled within said sleeve bearing and having its outer edge formed as a braking surface axially disposed with said bearing; said handle plate having a non-circular recess formed in said handle plate bearing; a resilient (frictional engagement member having a hub adapted for reciprocation within said recess in said handle plate bearing and adapted to engage the outer side plate of said line holding spool; adjustable means for varying the pressure between said engagement member and said spool; a dome-like cover for said spool adapted to be removably secured to said bearing plate; said cover having a radial, closed-ended slot in said cover; a line guiding bushing, slidably disposed within said slot; said slot being so proportioned that said bushing may be positioned on the axis of revolution of said spool or in the plane of revolution of said spool, and a handle, secured to said handle plate, for turning said spool.

2. A revolvable spool spinning reel, consisting of: a bearing plate, of circular form; an axial bearing secured to said bearing plate; a rod clip for securing said bearing plate to a fishing pole; a fishing line spool having a concentric sleeve bearing revolvably journaled within said axial bearing and adapted to support said spool in a cantilevered manner; a handle plate having a bearing adapted to be journaled within said sleeve bearing; said handle plate having a deformed recess formed in said handle plate bearing; a resilient, frictional engagement member having a hub adapted for reciprocation within said recess in said handle plate bearing and adapted to engage the outer side plate of said line holding spool; adjustable means for varying the pressure between said engagement member and said spool; a dome-like cover for said spool adapted to be removably secured to said bearing plate; said cover having a radial, closed-ended slot in said cover; a line guiding bushing, slidably disposed within said slot; said slot being so proportioned that said bushing may be positioned on the axis of revolution of said spool or in the plane of revolution of said spool, and a handle, secured to said handle plate, for turning said spool.

3. A revolvable spool spinning reel, consisting of: a bearing plate, of circular form, having a peripheral rim; an axial bearing secured at one end to said bearing plate; means for securing said bearing plate to a fishing pole; a fishing line spool having a concentric sleeve bearing revolvably journaled within said axial bearing and adapted to support said spool in a cantilevered manner; a handle plate having a bearing adapted to be journaled within said sleeve bearing and having a braking surface formed thereon axially disposed with said bearing; said handle plate bearing having a non-circular recess formed therein; a resilient, frictional engagement member having a hub adapted for reciprocation within said recess in said handle plate bearing and adapted to engage said line holding spool; adjustable means for varying the pressure between said engagement member and said spool; a cover for said spool adapted to be removably secured to said bearing plate; a line guiding bushing slidably mounted in said cover and supported so that said bushing may be positioned on the axis of revolution of said spool or in the plane of revolution of said spool, and a handle for turning said spool.

4. A revolvable spool spinning reel, consisting of: a bearing plate, of circular form; an axial bearing secured to said bearing plate; means for securing said bearing plate to a fishing pole; a fishing line spool having a concentric sleeve bearing revolvably journaled within said axial bearing and adapted to support said spool in a cantilevered manner; a handle plate having a bearing adapted to be journaled within said sleeve bearing and having its outer edge formed as a braking surface axially disposed with said bearing; said handle plate having a deformed recess formed in said handle plate bearing; a friction clutch having a hub adapted for reciprocation within said deformed recess and adapted to engage said line holding spool; adjustable means for varying the pressure applied to said clutch; a line guiding bushing; means for alternately positioning said bushing so it may be positioned on the axis of revolution of said spool or in the plane of revolution of said spool, and a handle for turning said spool.

PERRY V. McCASH.

REFERENCES CITED

The following references are of record in the file of this patent:

UNITED STATES PATENTS

| Number | Name | Date |
| --- | --- | --- |
| 161,314 | Winans et al. | Mar. 23, 1875 |
| 1,621,003 | Dodd | Mar. 15, 1927 |
| 2,299,156 | Lind | Oct. 20, 1942 |
| 2,551,320 | Ferguson | May 1, 1951 |
| 2,551,321 | Ferguson | May 1, 1951 |

FOREIGN PATENTS

| Number | Country | Date |
| --- | --- | --- |
| 8,517 of 1910 | Great Britain | Jan. 26, 1911 |
| 813,087 | France | Feb. 15, 1937 |